United States Patent Office 3,657,331
Patented Apr. 18, 1972

3,657,331
PROCESS FOR PREPARING ACRYLIC OR METHACRYLIC ACID
Jacob Ackermann, Gorla Minore, Roberto Croce, Erba, and Riccardo Reguzzoni, Busto Arisizio, Italy, assignors to Societá Italiana Resine S.p.A., Milan, Italy
No Drawing. Filed June 10, 1969, Ser. No. 832,018
Int. Cl. C07c *57/04*
U.S. Cl. 260—526 N     12 Claims

ABSTRACT OF THE DISCLOSURE

A process for preparing acrylic or methacrylic acid, which comprises passing a polyoxymethylene diester of the formula:

where $x$ has a value ranging from 1 to 3 and R is a member selected from the group consisting of a methyl and an ethyl radical, in the vapor phase, over a catalyst effective to convert the diester to acrylic or methacrylic acid, said catalyst being a member selected from the group consisting of (a) oxides, hydroxides, and carbonates, of one or more metals selected from the group consisting of lithium, sodium, potassium, magnesium, calcium, barium, boron, and aluminum, and
(b) natural aluminum silicates, synthetic aluminum silicates, molecular sieves, calcium phosphate, magnesium phosphate, magnesium silicate, and aluminum oxide, said process being carried out at a temperature ranging from 180° C. to 450° C.

BACKGROUND OF THE INVENTION

This invention relates to a process for preparing unsaturated aliphatic acids, namely acrylic and methacrylic acid, from polyoxymethylene diesters.

By diesters of polyoxymethylenes we refer to compounds of the following general formula:

wherein $x$ has a value of 1 to 3, and R is a methyl or ethyl radical.

It is known that such compounds are formed, for instance, as by-products during the stabilization of polyoxymethylenes in processes in which the unstable terminal groups of the macromolecules are esterified with the anhydride of acetic or propionic acid. During this esterification, which is carried out while maintaining the polymer suspended or dissolved in the liquid anhydride, or by causing a stream of gaseous anhydride to flow over the solid polymer, degradation processes occur in the polyoxymethylene, and formaldehyde as well as low molecular weight products are formed. The dissociation products of polyoxymethylene react with the anhydride of the acid to form as waste products the aforesaid polyoxymethylene diesters.

These diesters, in which $x$ is 1 to 3, are liquid at room temperature and can be purified and separated by vacuum distillation. However, the separation into the individual components is expensive, and moreover the mixture and the pure compounds are hardly of any value. The products wherein $x$ amounts to 1 or 2 are sometimes employed as solvents or esterification agents. In the latter case, however, their esterifying power is low.

The diesters can be decomposed at high temperature to the anhydride of the acid and to formaldehyde by the reaction:

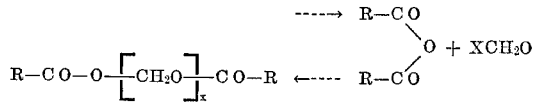

We have found that this reaction takes place very slowly within the temperature range of 200° to 400° C., and that in order to obtain industrially useful reaction rates, operation should be carried out at about 500° C.; however, at these high temperatures rather high quantities of by-products, such as ketone, oxides of carbon, methane, ethylene and the like are obtained at the same time as the desired products. Accordingly, not only are the yields low, but complex reaction mixtures are formed which require expensive purification treatments.

BRIEF DESCRIPTION OF THE INVENTION

It has now been found that the aforesaid polyoxymethylene diesters can be converted in a substantially quantitative manner to the unsaturated acids having one carbon atom more than the carboxylic acid present in an esterified form in the polyoxymethylene diester (i.e. polyoxymethylene diacetates and dipropionates are converted to acrylic and methacrylic acids, respectively), when they are supplied to suitable catalysts under the conditions defined hereinafter.

The catalytic reaction can proceed at high, commercially valuable, rates at temperatures below 400° C.

DESCRIPTION OF THE PREFERED EMBODIMENTS

The starting materials for the process of the invention are the above-mentioned polyoxymethylene diesters,

in which $x$ is 1 to 3, and R is the methyl or ethyl radical. These may be used in pure form or in admixture.

When the value of $x$ is 2, acrylic or methacrylic acid is obtained as the only useful product of the reaction, and this is the preferred embodiment. This applies to the case of a pure diester containing two oxymethylene groups in the molecule as well as to the case of mixture of the polyoxymethylene diesters in which the average value of $x$ is 2.

The polyoxymethylene diester starting materials can conveniently be obtained as by-products of the esterification of the terminal groups of raw polyoxymethylenes. They may also be obtained from the reaction of paraformaldehyde or high molecular weight polyoxymethylenes with a carboxylic acid or anhydride in the presence of small quantities of a strong acid or of a Lewis-type acid; in these cases, the reaction may be easily stopped when $x$ reaches a value of about 2. The diesters may also be obtained from any other available source.

Thus, high molecular weight polyoxymethylenes can be employed which, for any reason, are of no commercial value, such as products of unsuitable molecular weight, or coloured or insufficiently stable products.

Active catalysts suitable for use in the process of the invention are of various kinds. However, the preferred catalysts are obtained from an inert carrier treated with an oxide, hydroxide or carbonate of one or a plurality of the following metals:

metals belonging to group Ia of the periodic system, more particularly lithium, sodium and potassium;
metals belonging to group IIa of the periodic system, more particularly magnesium, calcium and barium;
boron and aluminium.

Carbon, asbestos and silica gel may be employed as inert carriers.

A further group of substances which may be utilized as catalysts according to the invention comprises: natural or synthetic aluminosilicates, molecular sieves, calcium phosphate, magnesium phosphate, magnesium silicate and aluminum oxide.

Generally, a particular activation of the catalyst is not necessary, though in certain cases a treatment at temperatures of 300° C. to 600° C. in the presence of steam and/or air is useful.

The process of the invention is best carried out at temperatures of 180° to 450° C., preferably 290° to 400° C.

Atmospheric or slightly superatmospheric pressure is preferred. It is possible to operate at a pressure of several atmospheres or in vacuum, but no particular advantages are obtained.

In order to improve selectivity in the formation of the acrylic or methacrylic acid, the reaction may be carried out in the presence of a diluent which comprises a gas inert towards the reagents and reaction products and/or comprises the saturated carboxylic acid corresponding to the acid bound in the form of ester in the polyoxymethylene diester. Where a carboxylic acid is employed as a diluent, it may be vaporised with the diester before supply to the catalyst, and recovered from the reaction products after condensation and recycled. Inert gases which may be employed as diluents are nitrogen, argon or carbon dioxide. The volumetric ratio of the polyoxymethylene diester to the diluent in the inlet gases to the reactor containing the catalyst may amount to 1:0.5 to 1:20, preferably 1:1 to 1:8.

The catalyst may be employed in the form of a stationary bed, in which case the spatial velocity may be between 100 and 600 liters of gas (the gas volume being calculated at 20° C. and 1 atmosphere) supplied per hour per liter of catalyst. Where the catalyst is employed in the form of a fluidized bed, the gas residence time in the reactor is preferably maintained at 1 to 30 seconds.

Under the above defined conditions conversions of the polyoxymethylene diester to unsaturated acids are obtained of values up to 90–95% and even more.

The acrylic or methacrylic acid can be easily recovered from the reaction products and is obtainable in a pure form by distillation in vacuum.

The unreacted products and any diluent present may be recycled to the reactor for further reaction.

The following examples further illustrate the invention.

EXAMPLE 1

A mixture composed of 1 mole polyoxymethylene diacetate, of the formula $$CH_3—CO—O[CH_2O]_xCO—CH_3$$

in which the average value of $x$ was about 2, and 10 moles acetic acid was continuously supplied to an evaporator, heated at 230° C., in which the mixture was evaporated.

The temperature was then raised to 370°–390° C. in a superheater, the vapors being introduced at the top into a cylindrical glass reactor of 20 mm. bore containing a stationary bed of aluminum silicate catalyst of composition 97% $SiO_2$ and 3% $Al_2O_3$. The specific surface of the catalyst exceeded about 500 sq.m./g. and was reduced before carrying out the test to about ⅓ of its value by heat treatment at 300°–450° C. The reactor was equipped with an external electric heater which maintained the temperature during reaction at 370°–390° C.

The rate of supply of the vapor was 300–350 liters/hour/liter catalyst, the volume being calculated at 20° C. and 1 atmosphere. The vapor issuing from the reactor was immediately condensed in a flowing water condenser. After 7 hours run under the above conditions 800 ml. clear condensate were obtained.

Part of the condensed product was subjected to fractional distillation in vacuum, and there was obtained a fraction boiling at a temperature of 59° C. and a pressure of 50 mm. Hg, refractive index $n_D^{20}=1.4194$.

The identification and quantitative evaluation of the acrylic acid in the distilled fraction was carried out by two further analytical methods: gas chromatography and chemical analysis by bromination of the double bond. These two methods showed that the fraction consisted of 95% by weight of acrylic acid; the gas-chromatographic analysis further indicated that the remaining 5% essentially comprised acetic acid.

The analysis by bromination was carried out by means of a solution of bromine in 0.2 normal potassium bromide. (When this analytical method was tested on acrylic acid of analytical grade (over 99% purity), the method gave an acid content of 98%.)

The gas chromatographic analysis was carried out at 140° C. in a helium stream, utilizing a column filled with microporous cross-linked aromatic polyolefin.

The analysis of the condensate leaving the reactor, carried out by the above described analytical methods, showed that 54% of the polyoxymethylene diacetate was converted to acrylic acid, and the reaction yield was 75%. The conversion and yield in all the examples were calculated as follows:

Percent conversion $$=\frac{\text{mols of formed unsaturated acid}}{\text{mols of supplied polyoxymethylene diester}}\times 100$$

Percent yield $$=\frac{\text{mols of formed unsaturated acid}}{\text{mols of supplied polyoxymethylene diester}-\text{mols of recovered polyoxymethylene diester}}\times 100$$

The mols of the polyoxymethylene diester are expressed in both cases as mols actually supplied multiplied by the value of $x$ as defined above.

Example 2

Example 1 was repeated with the following variations.

The catalyst employed was a natural aluminium silicate of the following composition by weight: SiO 68%, $Al_2O_3$ 12%, MgO 10.5%, $Fe_2O_3$ 5.0%, CaO 1.7%, $P_2O_5$ 1.0%, $K_2O$ 1.0%, other compounds 8%. The catalyst was heated to 380° C.

The gas feed consisted of a polyoxymethylene diacetate in which the average value of $x$ was about 1.3, diluted with four times its volume of nitrogen. The gases were fed at a velocity of 120 liters per liter catalyst per hour, the apparatus and other conditions being the same as in the Example 1.

The conversion of the acrylic acid was 30% and the yield 55%.

Example 3

Example 2 was repeated using a gas feed consisting of a mixture of polyoxymethylene, diacetate, in which the average value of $x$ is 1.3, and (as diluent) aqueous formaldehyde (titrating 85% by weight) in a quantity of 45% and 65%, respectively. Nitrogen was again supplied in a quantity of 4 parts by volume to 1 part by volume of diester. The conversion and acrylic acid yield were both below 1%.

Example 4

The operation was carried out under the conditions of Example 3 using a mixture of the polyoxymethylene diacetate and aqueous acetic acid (titrating about 85% acid by weight) in a quantity of 35% and 65% by weight, respectively. Nitrogen was again supplied in a quantity of 4 parts by volume to one part diester.

The acrylic acid conversion was 3% and the yield 16%.

In Examples 3 and 4 the diester issuing from the reactor was in a fully hydrolyzed form.

Example 5

Using the apparatus of Example 1, to the evaporator there was fed a catalytic suspension comprising 15% by weight oxymethylene diacetate, in which the value of $x$ is 1, and 85% anhydrous acetic acid.

The catalyst was the same as in Example 1, but was treated before use with a magnesium chloride solution, washed with water and activated.

The reaction temperature was maintained at 320° C. at a velocity of gas feed of 250–300 liters per hour and per liter catalyst.

Samples were taken after 3 and 15 hours run, and the acrylic acid yields were determined thereon. They amounted to 95% for the first sample and 93% for the second sample.

Example 6

This test was carried out to investigate the activity of the catalyst with time, using the apparatus described in Example 1.

The catalyst was aluminum oxide of an acid type prepared by a process similar to that used for preparing products suitable for gas chromatography. The catalyst was activated for 5 hours at 380° C.

Polyoxymethylene diacetate, in which $x$ was about 2, acetic acid and nitrogen in a molar ratio of about 1:2:4 were fed over the catalyst. The reactor temperature was maintained at 350° C. during the tests and the velocity of the gas feed was 250–300 liters per hour and per liter catalyst.

Under these conditions samples were taken and analyzed every ten hours for 60 hours. The conversion was found to be almost constant throughout the run, the overall acrylic acid yield exceeding 90%.

Example 7

In this example the catalyst was used in a fluidized form.

A mixture comprising 20% polyoxymethylene propionate, in which $x$ was about 1.6, 10% polyoxymethylene propionate, in which $x$ was about 2.5, the remainder being anhydrous propionic acid, was supplied to the evaporator together with a nitrogen stream so that the volumetric ratio of the evaporated mixture to nitrogen was 1:10.

The vapours were then heated at 390° C. in the superheater and supplied through a porous diaphragm to the reactor base, so that the catalyst particles were in a fluized form.

The catalyst consisted of silica (sand) on which was precipitated an aluminosilicate of high specific surface of the composition by weight $SiO_2$ 88–92%, and $Al_2O_3$ 12–8%. After being dried at 20–300° C., 300 g. of the catalyst were placed in a column 2.6 cm. in diameter, previously filled with water, and treated with 5 liters of a 0.1 N lithium hydroxide solution, supplied at a rate of 250–300 ml./hour. After washing for ten hours with distilled water at a rate of 250–300 ml./hour, the catalyst, treated as above, of a particle size of 50 to 80 mesh, was activated for ten hours at 380° C.

The velocity of the vapour feed was 650 liters/hour/liter catalyst.

A part of the condensate obtained by cooling the reaction gases was subjected to fractional distillation in vacuum, and a fraction was obtained which boils a at temperature of 79–80° C. at a pressure of 30 mm. Hg. Gas chromatographic and bromination analyses showed that this fraction contained methacrylic acid in a quantity of 94% by weight. The gas chromato graphic analysis moreover showed that the remainder essentially comprised propionic acid. The analysis of the condensate leaving the reactor showed that the conversion to methacrylic acid was 48% and the yield exceeded 90%.

What is claimed is:

1. A process for preparing acrylic or methacrylic acid, which comprises passing a polyoxymethylene diester of the formula:

wherein $x$ has a value ranging from 1 to 3 and R is a member selected from the group consisting of a methyl and an ethyl radical, in the vapor phase, over a catalyst effective to convert the diester to acrylic or methacrylic acid, said catalyst being a member selected from the group consisting of
   (a) oxides, hydroxides, and carbonates, of one or more metals selected from the group consisting of lithium, sodium, potassium, magnesium, calcium, barium, boron, and aluminum, and
   (b) natural aluminum silicates, synthetic aluminum silicates, molecular sieves, calcium phosphate, magnesium phosphate, magnesium silicate, and aluminum oxide, said process being carried out at a temperature ranging from 180° C. to 450° C.

2. The process as claimed in claim 1, wherein the value for $x$ is 2.

3. Process as claimed in claim 1, wherein the temperature is from 290° to 400° C.

4. Process as claimed in claim 1, wherein the reaction is carried out in the presence of a diluent of a gas inert to the reagents and reaction products.

5. Process as claimed in claim 4, wherein the diluent is selected from the group consisting of nitrogen, argon and carbon dioxide.

6. Process as claimed in claim 1, wherein the reaction is carried out in the presence of a diluent of a saturated carboxylic acid corresponding to the carboxylic acid present in ester form in the polyoxymethylene diester.

7. Process as claimed in claim 6, wherein the carboxylic acid used as diluent is vaporized together with the polyoxymethylene diester.

8. Process as claimed in claim 4, wherein the volumetric ratio of polyoxymethylene diester to diluent in the gas feed to the catalyst is 1:0.5 to 1:20.

9. Process as claimed in claim 10, wherein the volumetric ratio is 1:1 to 1:8.

10. Process as claimed in claim 1, wherein the catalyst is activated before use by heating at a temperature of 300° to 600° C. in the presence of steam and/or air.

11. Process as claimed in claim 1, wherein the catalyst is used in the form of a stationary bed, and the velocity of the gaseous feed mixture amounts to 100 to 600 liters gas (calculated at 20° C. and 1 atmosphere) per liter catalyst per hour.

12. Process as claimed in claim 1, wherein the catalyst is used in the form of a fluidized bed, and the residence time of the gas is 1 to 30 seconds.

References Cited

UNITED STATES PATENTS 3,247,248   4/1966   Sims et al. _____ 260—526

JAMES A. PATTEN, Primary Examiner

U.S. Cl. X.R.

260—496

UNITED STATES PATENT OFFICE
CERTIFICATE OF CORRECTION

Patent No. 3,657,331    Dated April 18, 1972

Inventor(s)    Jacob ACKERMANN et al

It is certified that error appears in the above-identified patent and that said Letters Patent are hereby corrected as shown below:

In the Heading:

The claim of Priority omitted. Should read:

--Foreign Priority Data

June 24, 1968   Italy .......... 18118-A/68--

Signed and sealed this 9th day of January 1973.

(SEAL)
Attest:

EDWARD M. FLETCHER, JR.          ROBERT GOTTSCHALK
Attesting Officer                 Commissioner of Patents